(12) United States Patent
Kitamura et al.

(10) Patent No.: US 6,634,838 B2
(45) Date of Patent: Oct. 21, 2003

(54) NC MACHINE TOOL

(75) Inventors: Koichiro Kitamura, Takaoka (JP);
Akihiro Kitamura, Takaoka (JP);
Kosaku Kitamura, Takaoka (JP)

(73) Assignee: Kitamura Machinery Co., Ltd. (JP)

( * ) Notice: Subject to any disclaimer, the term of this patent is extended or adjusted under 35 U.S.C. 154(b) by 106 days.

(21) Appl. No.: 09/944,149

(22) Filed: Sep. 4, 2001

(65) Prior Publication Data
US 2002/0197124 A1 Dec. 26, 2002

(30) Foreign Application Priority Data

Jun. 22, 2001 (JP) .......................................... 2001-189156

(51) Int. Cl.[7] ................................................ B23Q 5/56
(52) U.S. Cl. ............................. 409/235; 74/29; 74/409; 408/234; 409/146
(58) Field of Search ........................... 74/29, 409, 440; 409/5, 235, 237, 145, 146; 408/234, 237

(56) References Cited

U.S. PATENT DOCUMENTS 2,493,512 A * 1/1950 Vickers ..................... 409/146
2,573,098 A * 10/1951 Ernst et al. ................ 409/146
2,788,718 A * 4/1957 Matellotti .................. 409/102
2,902,875 A * 9/1959 Finally et al. .............. 74/409
3,006,215 A * 10/1961 Musser ..................... 74/665 E
3,316,772 A * 5/1967 Jones ........................ 74/410
3,398,595 A * 8/1968 Clutter ...................... 74/409
3,460,435 A * 8/1969 Hucks et al. .............. 409/183
4,714,388 A * 12/1987 Siler ......................... 409/196
5,183,374 A * 2/1993 Line .......................... 409/286
5,882,158 A * 3/1999 Lechleiter et al. ......... 409/146

FOREIGN PATENT DOCUMENTS

FR  1262750  * 4/1961 ................ 409/5
JP  99535  * 6/1985 ................ 409/146

* cited by examiner

*Primary Examiner*—Daniel W. Howell
(74) *Attorney, Agent, or Firm*—Lorusso, Loud & Kelly

(57) ABSTRACT

A NC machine tool having a constitution in which a table (15, 115) for placing a work thereon and a spindle (14, 114) for setting a tool are relatively moved by three feed mechanisms (18–20, 118–120), for X-axis, for Y-axis, and for Z-axis, to carry out machining. A preload is applied to all the three feed mechanisms (18–20, 118–120), for X-axis, for Y-axis, and for Z-axis, using a rack-pinion (21, 22, 24, 25, 27, 28, 121, 122, 124, 125, 127, 128), and using two motors (16, 23, 29) for each axis to prevent backlash in the rack-pinion.

2 Claims, 3 Drawing Sheets

NC MACHINE TOOL

FIELD OF THE INVENTION

This invention relates to a NC machine tool having a constitution in which a table for placing a work thereon and a spindle for setting a tool are relatively moved by feed mechanisms to carry out machining.

RELATED ART

In the conventional machine tool, a feed mechanism using a ball screw is general, by which a table or a spindle is moved.

With the recent progress of higher speed of a machine tool, it has been required to feed a table or a spindle at high speed.

For achieving the higher speed, a feed mechanism using a linear motor as a drive source has been produced by way of trial, but the sufficient result has not been obtained.

The conventional feed mechanism of a ball screw type is able to realize a highly accurate and smooth feeding. However, in the ball screw type, it has been difficult to correspond to the higher speed since a feed speed has a limitation.

SUMMARY OF THE INVENTION

It is an object of this invention to provide a NC machine tool capable of making a feed speed higher, and being provided with a feed mechanism enabling smooth and highly accurate feeding.

Solving means of the present invention are illustrated as follows:

(1) A NC machine tool having a constitution in which a table for placing a work thereon and a spindle for setting a tool are relatively moved by three feed mechanisms, for X-axis, for Y-axis, and for Z-axis, to carry out machining, wherein a preload is applied to all the three feed mechanisms, for X-axis, for Y-axis, and for Z-axis, using a rack-pinion, and using two motors for each axis to prevent backlash in the rack-pinion.

(2) A horizontally arranged rack has teeth directed downward.

(3) As a rack-pinion, a helical rack-pinion is used.

(4) As a rack-pinion, a double-helical rack-pinion is used.

In the NC machine tool according to the present invention, a table for placing a work thereon and a spindle for setting a tool are relatively moved by three feed mechanisms, for X-axis, for Y-axis, and for Z-axis, to carry out machining. In all the three feed mechanisms, for X-axis, for Y-axis, and for Z-axis, a rack-pinion is used.

Two motors are used for each axis to double the driving force, and backlash of a rack and a pinion is removed by preloading.

Moreover, a horizontally arranged rack has teeth directed downward or directed laterally. Thereby, it is possible to prevent the rack tooth face from staying of foreign matter thereon.

As a rack-pinion, a helical rack-pinion or a double-helical rack-pinion can be used. By using them, smoother feeding can be realized.

BRIEF DESCRIPTION OF THE DRAWINGS

The embodiments of the present invention will be described hereinafter with reference to the drawings.

DESCRIPTION OF THE PREFERRED EMBODIMENTS

Figure 1:
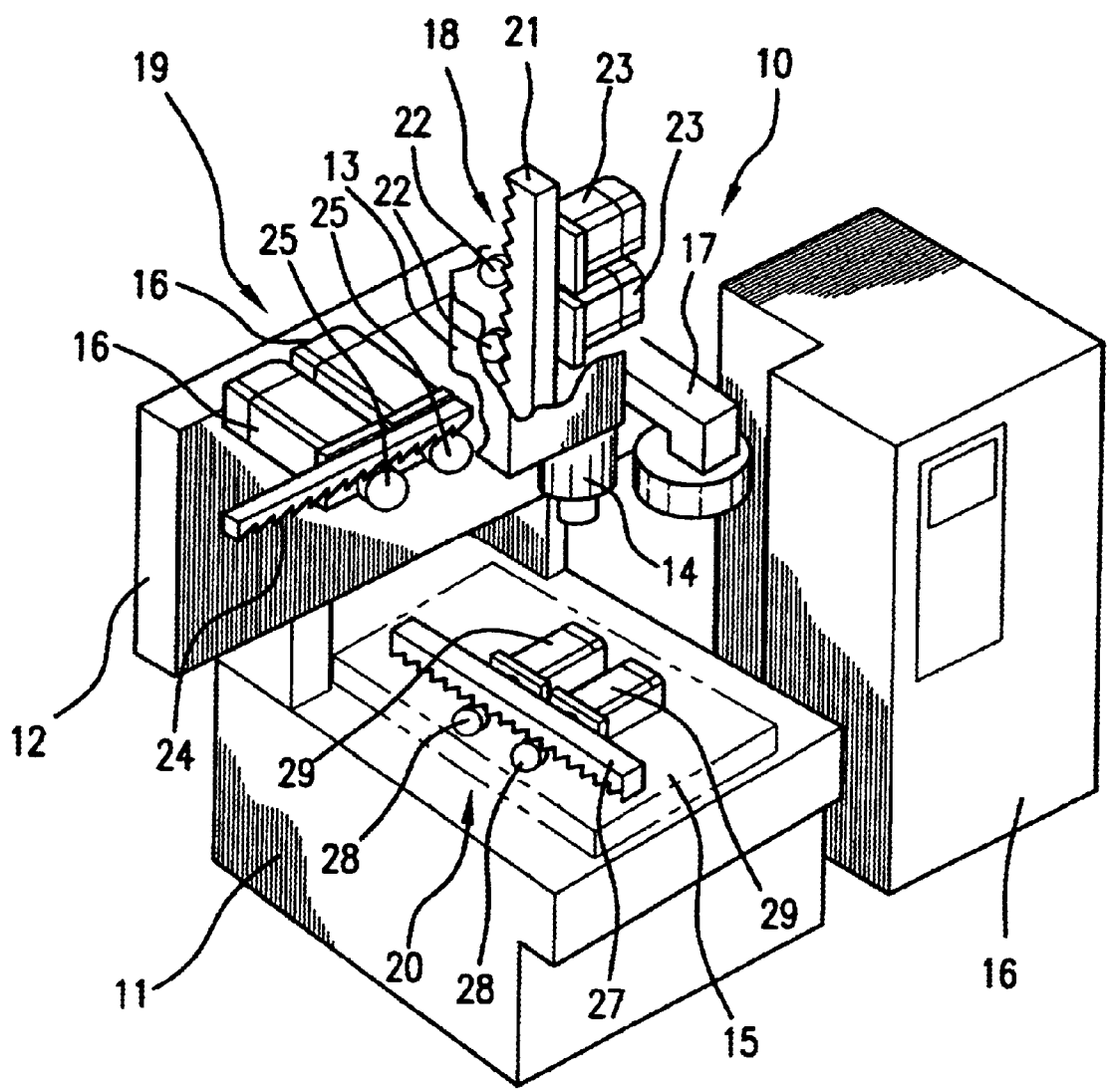
FIG. 1 is a conceptual view conceptually showing a first embodiment of a NC machine tool according to the present invention.

FIG. 1 is a conceptual view conceptually showing a first embodiment of a NC machine tool according to the present invention.

A vertical type machine tool 10 has the constitution similar to that of a normal machine tool except a feed mechanism for a table and a spindle.

The machine tool 10 has a base 11, on which a table 15 is arranged. The table is guided movably along the Y-axis direction by guide means (not shown) like rails, and is driven by a feed mechanism 20 for Y-axis.

Figure 3A:
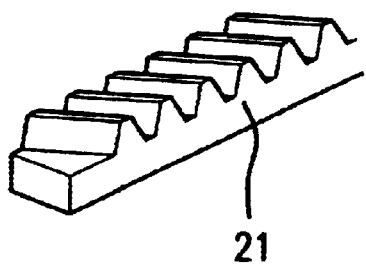
FIG. 3A is a perspective view showing a helical rack used for the NC machine tool.
Figure 3B:
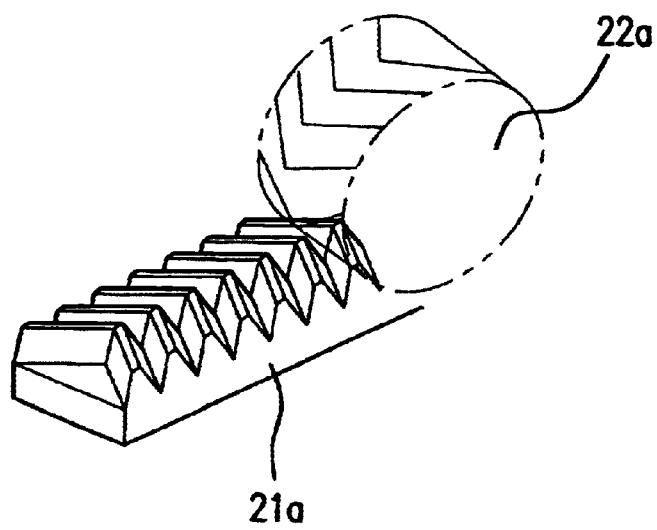
FIG. 3B is a perspective view showing a double-helical rack and a double-helical pinion.

The feed mechanism 20 for Y-axis is constituted by one rack 27, two pinions 28, and two servo motors 29. The one rack 27 is secured to the lower surface of the table along the Y-axis direction. The two servo motors 29 are installed on the base 11. The two pinions 28 are mounted on output shafts of the two motors 29, respectively, and are engaged with the rack 27. For the rack 27, a helical type as shown in FIG. 3A can be used.

As the rack-pinion, double-helical rack-pinions 21a, 22a can be also used.

A column 12 having a gate-shaped leg is formed above the base 11.

A spindle head 13 is arranged on the column 12.

The spindle head 13 is guided movably along the X-axis by guide means (not shown) like rails, and is driven by a feed mechanism 19 for X-axis.

The feed mechanism 19 for X-axis is constituted by one rack 24, two pinions 25, and two servo motors 16. The one rack 24 is arranged along the X-direction to the lower surface of the spindle head 13. The two servo motors 16 are installed on the column 12. The two pinions 25 are connected to output shafts of the two motors, respectively, and are engaged with one rack 24.

A spindle 14 is arranged on the spindle 13 in a longitudinal direction.

The spindle 14 is guided movably in a vertical direction (Z-axis direction) relatively to the spindle head 13, and is driven by a feed mechanism 18 for Z-axis.

The feed mechanism 18 for Z-axis is constituted by one rack 21, two pinions 22, and servo motors 23. The one rack 21 is secured in parallel with a diametrically central part of the spindle head 14. The two servo motors 23 are installed on the spindle head 13. The two pinions 22 are connected to output shafts of the two motors 23, respectively, and are engaged with one rack 21.

The spindle 14 is able to automatically detachably mount a tool by an automatic tool exchanging arm 17.

A control unit 16 for carrying out controlling of a tool magazine and the whole machine tool is arranged adjacent to the automatic tool exchanging arm 17.

Figure 2:
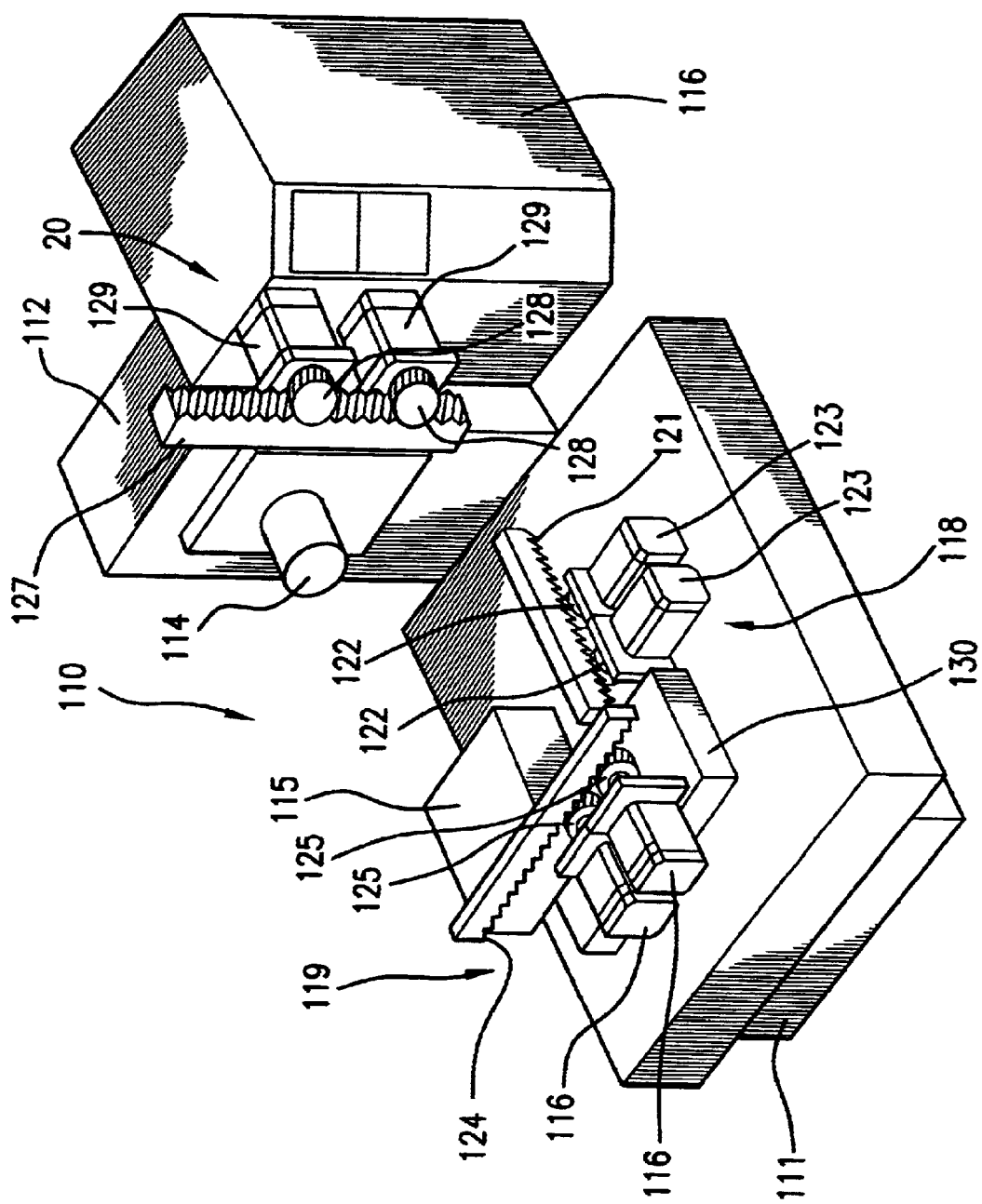
FIG. 2 is a conceptual view conceptually showing a second embodiment of a NC machine tool according to the present invention.

The second embodiment of the present invention will now be briefly described with reference to FIG. 2.

In a lateral type machine tool 110, a spindle 114 is arranged in a horizontal direction, and is movable in a Y-axis direction by a feed mechanism 20 for Y-axis.

A table 115 is constituted to be movable along the X-axis and the Z-axis.

A saddle 130 is arranged below the table 115. This saddle 130 is guided movably in a Z-direction by guide means like rails, and is driven by feed means for Z-axis.

The table 115 is guided movably in an X-axis direction on the upper surface of the saddle 130, and is driven by feed means 119 for X-axis.

The feed means 119, 120 and 118 for X–Z axes are respectively constituted using one rack, two pinions, and two servo motors, similarly to the feed means in the above-described embodiment.

Also in any of the above-described embodiments, a preload function is provided for the torque controlled by a position (speed) feed back by combination of two motors, an offset is applied and torques reverse to each other are applied to two shafts (a master shaft and a slave shaft) connected to two motors to assume a state that two pinions are always competed to one rack. By the preload function as described, the influence caused by backlash on the rack-pinion is reduced.

Further, the racks 24, 27, 121 and 124 arranged in the horizontal direction have their tooth directed downward. That is, there presents that the pinion supports the lower side of the rack.

In the NC machine tool according to the present invention, since the feed mechanism for each shaft is constituted using one rack, two pinions and two motors, the driving force is doubled, and the backlash of the rack-pinion can be prevented by the preload function of two motors. As a result, the feed speed can be made higher in a three-dimensional manner, and the smooth and highly accurate feed can be realized. Since there are less contact parts like the ball screw, no thermal displacement caused by heat generation occurs. Therefore, this can sufficiently correspond to the higher speed of processing.

Further, the racks arranged in the horizontal direction have their teeth directed downward. This obtains the effect capable of preventing foreign matter from staying on the tooth surface of the rack.

Particularly, the helical rack-pinion and the double-helical rack-pinion are used to thereby enable the smooth feeding.

The present invention is not limited to the aforementioned embodiments. The present invention can be applied to all vertical and lateral type machining centers, a gate type machining center, a NC milling machine, a drill, a mold processing machine and so on.

What is claimed is:

1. A NC machine tool having a table for placing a work thereon and a spindle for setting a tool and three feed mechanisms for moving the spindle relative to the table, on the X-axis, the Y-axis, and the Z-axis, respectively, to carry out machining, wherein a preload is applied to all the three feed mechanisms, wherein each feed mechanism includes a double helical rack-pinion, and wherein each double helical rack-pinion includes one rack, two pinions engaging the one rack and two motors respectively driving the two pinions, to prevent backlash in the double helical rack-pinion.

2. A NC machine tool according to claim 1, wherein the racks arranged in the horizontal direction have their tooth directed downward.

* * * * *